(12) United States Patent
Liang et al.

(10) Patent No.: US 12,545,766 B2
(45) Date of Patent: Feb. 10, 2026

(54) CURABLE POLYMER RESINS FOR 3D-PRINTABLE HIERARCHICAL NANOPOROUS FOAMS AND AEROGELS

(71) Applicant: Lawrence Livermore National Security, LLC, Livermore, CA (US)

(72) Inventors: Siwei Liang, Dublin, CA (US); Theodore F. Baumann, Discovery Bay, CA (US); Juergen Biener, San Leandro, CA (US); Monika M. Biener, San Leandro, CA (US); Bryan D. Moran, Pleasanton, CA (US); James Oakdale, Castro Valley, CA (US); Jianchao Ye, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 363 days.

(21) Appl. No.: 16/375,525

(22) Filed: Apr. 4, 2019

(65) Prior Publication Data

US 2020/0317870 A1  Oct. 8, 2020

(51) Int. Cl.
*C08J 9/28* (2006.01)
*B29C 64/112* (2017.01)
(Continued)

(52) U.S. Cl.
CPC ............. *C08J 3/075* (2013.01); *B29C 64/112* (2017.08); *B29C 64/153* (2017.08); *C08F 2/48* (2013.01);
(Continued)

(58) Field of Classification Search
CPC ....... C08J 9/26; C08J 9/28; C08J 9/286; C08J 3/075; C08J 9/008; C08J 9/228;
(Continued)

(56) References Cited

U.S. PATENT DOCUMENTS

| 2007/0123628 | A1* | 5/2007 | Shirasaki | C08J 3/03 524/492 |
| 2008/0096987 | A1* | 4/2008 | Podszun | C08F 257/02 521/25 |

(Continued)

FOREIGN PATENT DOCUMENTS

| WO | WO-2018005501 A1 * | 1/2018 | ............. B29C 64/00 |
| WO | 2018065094 A1 | 4/2018 | |

OTHER PUBLICATIONS

Machine translation of CN 104628917A by Lu et al. (Year: 2015).*
(Continued)

*Primary Examiner* — Christina H.W. Rosebach
(74) *Attorney, Agent, or Firm* — Zilka-Kotab, P.C.

(57) ABSTRACT

In one embodiment, a mixture includes a polyfunctional monomer having at least one functional group amenable to polymerization, a porogen, and a polymerization initiator. In another embodiment, a product includes a porous three-dimensional structure formed by additive manufacturing, where the porous three-dimensional structure has ligaments arranged in a geometric pattern, the ligaments defining pores therebetween. The pores have an average diameter greater than about 10 microns, where an average length scale of the ligaments is greater than 100 nanometers. The ligaments are nanoporous, where at least 80% of a volume measured according to outer dimensions of the porous three-dimensional structure corresponds to the pores.

23 Claims, 9 Drawing Sheets

(51) Int. Cl.
B29C 64/153 (2017.01)
B33Y 80/00 (2015.01)
C08F 2/48 (2006.01)
C08J 3/075 (2006.01)
C08K 3/04 (2006.01)
C08L 57/00 (2006.01)
B33Y 10/00 (2015.01)
B33Y 70/10 (2020.01)

(52) U.S. Cl.
CPC ............... C08J 9/286 (2013.01); C08K 3/042 (2017.05); C08L 57/00 (2013.01); *B33Y 10/00* (2014.12); *B33Y 70/10* (2020.01); *B33Y 80/00* (2014.12); *C08J 2205/026* (2013.01); *C08J 2205/044* (2013.01); *C08J 2323/00* (2013.01); *C08J 2333/08* (2013.01); *C08J 2333/10* (2013.01); *C08J 2341/00* (2013.01); *C08J 2363/00* (2013.01); *C08J 2375/00* (2013.01); *C08L 2203/14* (2013.01)

(58) Field of Classification Search
CPC ............. C08J 2205/026; C08J 2323/00; C08J 2333/08; C08J 2333/10; C08J 2341/00; C08J 2363/00; C08J 2375/00; C08J 3/042; C08J 2333/12; C08J 9/283; C08F 2/48; C08F 2/42; C08L 27/18; C08L 57/00; C08L 2203/14; B29C 39/003; B29C 64/112; B29C 64/153; C08K 3/042; B33Y 10/00; B33Y 80/00

See application file for complete search history.

(56) References Cited

U.S. PATENT DOCUMENTS

| 2010/0233448 | A1* | 9/2010 | Kameyama | .......... | C09D 11/324 |
| | | | | | 524/853 |
| 2011/0033663 | A1* | 2/2011 | Svec | ................ | C08F 220/1804 |
| | | | | | 521/50 |
| 2019/0185328 | A1* | 6/2019 | Humpal | ................ | C01B 33/158 |

OTHER PUBLICATIONS

CN 104628917_Scifinder abstract. by Scifinder. Accessed Mar. 16, 2021. (Year: 2015).*
Larranaga, M.D., Lewis, R.J., Sr. and Lewis, R.A. (2016). R. In Hawley's Condensed Chemical Dictionary, Sixteenth Edition (eds M.D. Larranaga, R.J. Lewis and R.A. Lewis). https://doi.org/10.1002/9781119312468.ch18 (Year: 2016).*
Michael Müller et al 2015 Biofabrication 7 035006 (Year: 2015).*
Machine Translation of JP H0967307 by Nakamura et al. (Year: 1997).*
Machine translation of CN 108855229 A (Year: 2018).*

Rolland et al., "Solvent-Resistant Photocurable "Liquid Teflon" for Microfluidic Device Fabrication," Journal of the American Chemical Society, vol. 126, 2004, pp. 2322-2323.
Williams et al., "High-Resolution PFPE-based Molding Techniques for Nanofabrication of High-Pattern Density, Sub-20 nm Features: A Fundamental Materials Approach," American Chemical Society, Nano Letters, vol. 10, 2010, pp. 1421-1428.
Demarco et al., "A New Perfluoropolyether-Based Hydrophobic and Chemically Resistant Photoresist Structured by Two-Photon Polymerization," American Chemical Society, Langmuir, vol. 29, 2013, pp. 426-431.
Keller et al., "Study of Biofilm Growth on Slippery Liquid-Infused Porous Surfaces Made from Fluoropor," American Chemical Society, Applied Materials and Interfaces, vol. 11, Jan. 15, 2019, pp. 4480-4487.
Helmer et al., "Transparent, abrasion-insensitive superhydrophobic coatings for real-world applications," Scientific Reports, vol. 7, Nov. 8, 2017, pp. 15078:1-15078:6.
Gladysz et al., "Chapter 4: Techniques for Introducing Intentional Voids into Materials," Voids in Materials, Elsevier B.V., 2015, pp. 49-71.
Zheng et al., "Multiscale metallic metamaterials," Nature Materials, vol. 15, Oct. 2016, pp. 1100-1106.
Chen et al., "Preparation of polymer-based porous scaffolds for tissue engineering," Characterisation and Design of Tissue Scaffolds, Elsevier B.V., 2016, pp. 105-125.
Mane S., "Effect of Porogens (Type and Amount) on Polymer Porosity: A Review," Canadian Chemical Transactions, vol. 2, Issue 2, 2016, pp. 210-225.
Hensleigh et al., "Additive manufacturing of complex microarchitected graphene aerogels," Materials Horizons, vol. 5, No. 6, Nov. 2018, pp. 1035-1041.
Mu et al., "Porous polymeric materials by 3D printing of photocurable resin," Materials Horizons, 2017, pp. 442-449.
Zheng et al., "Ultralight, Ultrastiff Mechanical Metamaterials," Science, vol. 344, Issue 6190, Jun. 20, 2014, pp. 1373-1377.
Ge et al., "Multimaterial 4D Printing with Tailorable Shape Memory Polymers," Scientific Reports, No. 6:31110, Aug. 8, 2016, pp. 1-11.
Lewis J., "Direct Ink Writing of 3D Functional Materials," Advanced Functional Materials, vol. 16, 2006, pp. 2193-2204.
Rodriguez et al., "Shape-morphing composites with designed microarchitectures," Scientific Reports, No. 6:27933, Jun. 15, 2016, pp. 1-10.
Zhu et al., "Highly compressible 3D periodic graphene aerogel microlattices," Nature Communications, No. 6:6962, Apr. 22, 2015, pp. 1-8.
Biener et al., "Advanced carbon aerogels for energy applications," Energy & Enviornmental Science, vol. 4, Feb. 16, 2011, pp. 656-667.
Oakdale et al., "Post-print UV curing method for improving the mechanical properties of prototypes derived from two-photon lithography," Optics Express, vol. 24, No. 24, Nov. 28, 2016, pp. 27077-27086.
Duoss et al., "Three-Dimensional Printing of Elastomeric, Cellular Architectures with Negative Stiffness," Advanced Functional Materials, vol. 24, 2014, pp. 4905-4913.

* cited by examiner

R = Any group containing a carbon or hydrogen

FG = acrylate, methacrylate, epoxide, olefin, isocyanate, mercapto + olefin

Any non-reactive solvent that can be subsequently removed after gelation.

104    PEG-400

CURABLE POLYMER RESINS FOR 3D-PRINTABLE HIERARCHICAL NANOPOROUS FOAMS AND AEROGELS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to photo-polymerization based additive manufacturing techniques, and more particularly, this invention relates to UV-curable polymer resins for polymer foams and carbon aerogels formed by additive manufacturing.

BACKGROUND

Over the past decade, advances in additive manufacturing (AM) have enabled the fabrication of low-density, high-strength materials with engineered architectures. AM technologies such as stereolithography (SLA), fused deposition modeling (FDM), selective laser sintering (SLS), and direct ink writing (DIW) have demonstrated the ability to pattern to varying degrees, a wide variety of materials, including metals, ceramics, plastics, rubbers, etc. Different AM techniques are distinguished from one another based on material process-ability, resolution capability and throughput. In other words, not all materials are directly amenable to AM, and moreover, factors such as cure-rate, rheological properties, stability, compatibility, etc. need to be considered and adjusted accordingly. FDM and SLA, for instance, are largely restricted to polymer or polymeric-based composites, whereas SLS (used interchangeably here with select laser melting) can process a different subset of polymers in addition to select glasses, ceramics, metals, etc.

Recently, studies at Lawrence Livermore National Laboratory have shown custom formulations of three-dimensional (3D) printed graphene-based carbon aerogels using DIW. 3D printed graphene structures are inherently hierarchically in nature. Graphene-based carbon aerogels are a class of low density porous materials with intrinsic high specific surface area (for example, surface area may range from 400-3000 $m^2/g$) and excellent electrical conductivity. Thus, applications of carbon aerogels range from energy storage (e.g., as electrodes in capacitors, actuators, or for deionization) chemical detectors, to energy absorption material (e.g., cushions, insulation, laser targets, etc.).

However, the resolution of DIW of graphene-based carbon aerogels is limited typically to greater than 100 microns (μm) although features below 10 μm have been demonstrated. At these length scales a volume-specific surface area of printed structures is limited. And while stereolithography-based AM techniques have typically higher resolution (below 100 μm), these techniques are limited as well to tens of microns, far above the diffraction limit of light.

Consequently, obtaining high surface area of a printed part may likely rely on integration of nanostructures. Because all AM techniques produce parts with limited resolution, nanofeatures have not as yet been printed directly. Rather, nanofeatures have been integrated in the resin using alternative methods so that a nanostructure develops after the printing process by principles of self-assembly and self-organization.

Moreover, conventional carbon aerogel synthesis methods rely on using resorcinol and formaldehyde precursor components. It is well documented that both resorcinol and formaldehyde are hazardous chemicals and toxic to the environment. It would be desirable to develop an environmentally-friendly feedstock for fabricating 3D-printed carbon aerogels and foams having high surface area and printed nanoscale features.

SUMMARY

In one embodiment, a mixture includes a polyfunctional monomer having at least one functional group amenable to polymerization, a porogen, and a polymerization initiator.

In another embodiment, a product includes a porous three-dimensional structure formed by additive manufacturing, where the porous three-dimensional structure has ligaments arranged in a geometric pattern, the ligaments defining pores therebetween. The pores have an average diameter greater than about 10 microns, where an average length scale of the ligaments is greater than 100 nanometers. The ligaments are nanoporous, where at least 80% of a volume measured according to outer dimensions of the porous three-dimensional structure corresponds to the pores.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm ±1 nm, a temperature of about 50° C. refers to a temperature of 50° C.±5° C., etc.

A nanoscale is defined as between 1 nanometer and about 500 nanometers.

For the purposes of this description, macropores are defined as having an average diameter of greater than 1 millimeter (mm). Mesopores are defined as having an average diameter of less than 1 mm and greater than about 10 microns (pm). Micropores are defined as having an average diameter less than about 10 μm and greater than about 100 nanometers (nm). Nanopores are defined as having an average diameter less than 1 μm and greater than 0 nanometers. These ranges are approximate and may overlap, e.g., a large nanopore may also be defined as a small micropore.

The following description discloses several preferred embodiments of an UV-curable polymer resins for polymer foams and carbon aerogels formed by additive manufacturing and/or related systems, methods and formulations.

In one general embodiment, a mixture includes a polyfunctional monomer having at least one functional group amenable to polymerization, a porogen, and a polymerization initiator.

In another general embodiment, a product includes a porous three-dimensional structure formed by additive manufacturing, where the porous three-dimensional structure has ligaments arranged in a geometric pattern, the ligaments defining pores therebetween. The pores have an average diameter greater than about 10 microns, where an average length scale of the ligaments is greater than 100 nanometers. The ligaments are nanoporous, where at least 80% of a volume measured according to outer dimensions of the porous three-dimensional structure corresponds to the pores.

A list of acronyms used in the description is provided below.
3D Three-dimensional
AM Additive Manufacturing
DIW Direct ink writing
DLW-TPP Direct laser writing-two photon polymerization
FG Functional group
μm micron
nm nanometer
PμSL Projection microstereolithography
SEM Scanning Electron Micrograph
UV Ultraviolet According to various embodiments, a method is described for patterning hierarchical nanoporous materials via additive manufacturing (AM) techniques. In various approaches, the architectural features of the formed 3D parts have length scales defined by AM processes to be in a range between 0.1 micron (pm) to greater than 100 μm. The pores formed and defined by the resin mixture used for the AM process may include a length scale of 1 μm and below. In various approaches, the resin mixture is engineered to generate a porosity of the structure through principles of self-assembly and phase segregation.

In conventional methods, porous polymers, foams, and aerogels typically are prepared using bulk chemical processes that tend to introduce porosity by physical and/or chemical blowing agents, by leaching of porogens, etc. Porogens may be defined as any mass of material that can be used to create a porous structure upon removal after solidification via chemical crosslinking/reaction of the surrounding material. Removal of the porogen by leaching leaves negative replica pores in the structure, these pores may range in size from several nanometers (nm) to 10 s of microns depending on the composition and concentration of the porogen.

According to one embodiment, an optically transparent, porogen-containing photoresist may be formed as a feedstock for additive manufacturing (AM) processes. Following printing of a three-dimensional structure with the optically transparent, porogen-containing photoresist, the porogen within the printed part may be leached away thereby resulting in the formation of hierarchical porous structure with sub-micron pores.

According to various embodiments, methods are described for forming a feedstock as a precursor for 3D printable aerogels and in some iterations, ultra-low density carbon aerogels. In some approaches, a low density carbon aerogel may have ligaments comprised of nanoporous graphene formed during graphitization. Further, the arrangement of the printed ligaments in the aerogel may provide a higher-order porosity (10 s to 100 s microns). In one approach, nanoporous aerogels formed by methods described herein may be useful for applications that include mass transport.

In various approaches, AM techniques provide control of printing features, ligaments, etc. of 3D structures having length scales in a range between 0.1 μm to greater than 100 μm, and more likely greater than 10 μm. Further, a UV-curable functionality lends itself to light-driven AM techniques, including projection micro-stereolithography (PμSL) and direct laser writing via two photon polymerization (DLW-TPP). Stereolithography-based AM techniques are notable for high throughput, fine features and detailed prototyping. Even higher resolution can be achieved with DLW-TPP, which can produce ligaments on the order of 100 nm.

The printed hierarchical porous polymer structure may find use for such applications as membranes, light weight yet stiff structural materials. The resulting well-defined nanoporous polymer framework may additionally be carbonized into a carbon aerogels thereby imparting electrical conductivity for applications such as energy storage. Various embodiments described herein enable fabrication of macroscopic aerogels with engineered hierarchical structures including digitally controlled macroporous systems for fast mass transport and nanopores for high surface area. For example, in one approach, an aerogel may be formed with a higher level porosity having pores in a range of greater than 1 millimeter (mm) (e.g., macroporous), and having ligaments with average length scales greater than 1 micron (pm), where the ligaments are characterized by nanoporous material.

According to one embodiment, a mixture includes two main components, a polyfunctional monomer having at least one functional group amenable to polymerization (e.g., crosslinking) and a porogen. The mixture may also include a polymerization initiator. In one approach, the mixture may include a polyfunctional monomer having at least two functional groups amenable to polymerization and a porogen. In one approach, the mixture may be a resin. In one approach, the mixture is a photoresist mixture and includes a polyfunctional monomer having at least one functional group amenable to polymerization, a porogen, a photoinitiator and a polymerization inhibitor. In yet other approaches, the mixture may also include additives, e.g., a photoabsorber.

In one approach, the polyfunctional monomer has at least one functional group amenable, susceptible, reactive, etc. to polymerization. For instance, the functional group may be capable of being acted upon in a particular way to result in polymerization of the monomers. In some approaches, polymerization may lead to crosslinking between neighboring polymer chains. In some approaches, reactions among functional groups may create a crosslinking structure.

For example, in one approach, when a polyfunctional monomer having at least one functional group amenable to radical polymerization is combined with a polymerization initiator such as a photoinitiator, then the functional group of the polyfunctional monomer may be amenable to radiation-initiated polymerization. In general, a radiation curable functional group can be any suitable group or molecule that provides the desired effect upon curing, e.g., crosslinking, polymerization, etc. In one approach, a polyfunctional monomer has at least one functional group that when combined with an appropriate photoinitiator will cure under ultraviolet irradiation. The photoinitiator determines the response to light, thus, for example, a photoinitiator makes the resin sensitive towards UV. Thus, a polyfunctional monomer preferably has functional groups amenable to radical polymerization, but these functional groups preferably are not sensitive to UV in the absence of a photoinitiator.

Figure 1A:
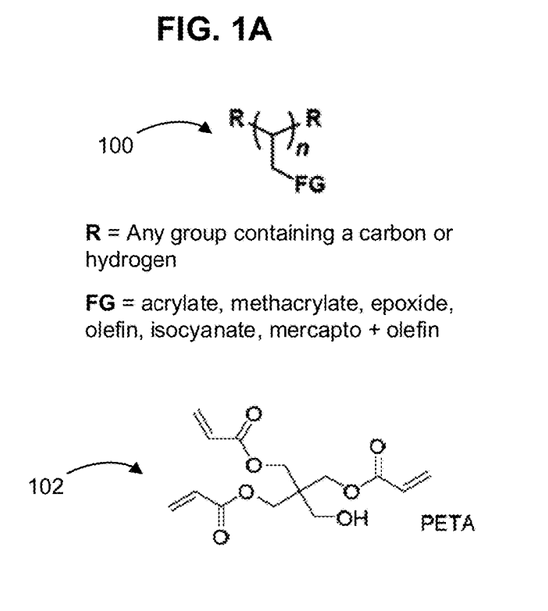
FIGS. 1A-1B are schematic drawings of components of a resin, according to one embodiment.
Figure 1B:
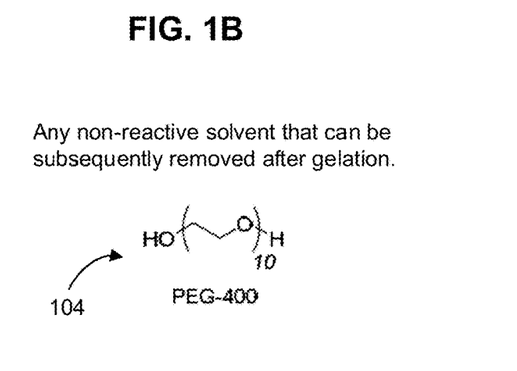

FIGS. 1A and 1B depict schematic drawings of illustrative components of a mixture having components A and B, according to one embodiment. As shown, component A may be the illustrative polyfunctional monomer 100 having at least one functional group amenable to polymerization. A structural formula of the illustrative polyfunctional monomer 100 may be as follows:

where R includes one or more elements having carbon (C) and/or hydrogen (H), and the functional group (FG) amenable to polymerization includes at least one of the following: acrylate, methacrylate, epoxide, olefin, isocyanate, systems including both mercapto and vinyl groups (e.g., mercaptan+olefin), etc. These approaches are by way of examples and are not meant to be limiting in any way. In some approaches, component A may include a combination of different polyfunctional monomers having functional groups amenable to polymerization. In some approaches, the polyfunctional monomer may include a functionalized photo resist.

In some approaches, the multifunctional monomer has at least one functional group amenable to polymerization such that when the monomer is combined with a photoinitiator, at least one functional group is amenable to radiation initiated polymerization. However, in the absence of photoinitiator, the functional group is preferably not sensitive to radiation-initiated polymerization.

In one approach, the polyfunctional monomer has one monomer unit, as indicated in the structural formula having $n=1$ monomeric units. In another approach, the polyfunctional monomer may be present in a polymer having a plurality of polyfunctional monomers in a chain of the polymer. In one approach, the polyfunctional monomer may be present in a polymer having n monomeric units in a chain thereof. Thus, as illustrated in FIG. 1A, in various approaches, component A of the mixture includes a polyfunctional monomer 100 having $n \geq 1$ monomeric units. Further, provided only as an example of a polyfunctional monomer 100 and not meant to be limiting in any way, FIG. 1A illustrates the molecular structure of the polyfunctional monomer pentaerythritol triacrylate (PETA) 102. In one approach, the polyfunctional monomer may be cured from a liquid to a solid in the presence of a curing agent, e.g., photoinitiator.

In various approaches, the mixture includes a porogen, which is defined as any mass of material that can be used to create a porous structure and can be removed after solidification of the surrounding material, e.g., the surrounding material is component A. In one approach the porogen (e.g., component B) of the mixture is a non-reactive component. In some approaches, component B may be any non-reactive solvent that can be subsequently removed after gelation of the mixture. In one illustrative approach, an example of component B may be the porogen, polyethylene glyclol-400 (PEG-400) 104, as shown in FIG. 1B. In various approaches, the porogen is a component of the photoresist mixture but does not participate in the conversion of the photoresist mixture into a solid, e.g., curing step, and thus, may be removed from the resulting solid structure after curing.

In some approaches, the porogen may include any non-reactive diluent that is miscible with the polyfunctional monomer, such that porogen may be subsequently removed upon crosslinking (e.g., polymerization) of the polyfunctional monomer. In some approaches, the porogen is a liquid solvent. In other approaches, the porogen is a solid component of the mixture. In some approaches, the polyfunctional monomers having functional groups amenable to polymerization are soluble in a porogen.

In one approach, the concentration of the combination of component A and component B in the mixture may be as much as the total weight of the mixture and less the concentration of additives (e.g., polymerization initiator, polymerization inhibitor, photoabsorber, etc.). For example, and not meant to be limiting in any way, Equation 1 illustrates a total concentration of the mixture.

[Component A]+[Component B]=[Total mixture]−[Additives]   Equation 1

In one approach, the concentration of the combination of component A and component B in the mixture may be greater than 95 weight % (wt %) of the total mixture. In one approach, the concentration of the combination of component A and component B in the mixture may be greater than 98 wt % of total mixture.

In some approaches, a ratio of the polyfunctional monomer (e.g., component A) to the porogen (e.g., component B) may be in a range of about 2 parts polyfunctional monomer to 98 parts porogen (2:98) to about 50 parts polyfunctional monomer to 50 parts porogen (50:50). In one approach, a porogen concentration may be lower than 50 parts. In an exemplary approach, the ratio of polyfunctional monomer to porogen may be 3 parts to 97 parts on the basis of weight.

In various approaches, the density of polyfunctional monomer (component A) and the density of porogen (component B) may be the same, for example, around 1 gram/cubic centimeter (g/cc), thus, the ratio of polyfunctional monomer to porogen may be 3 parts to 97 parts on the basis of volume.

In one approach, the concentration of the polyfunctional monomer, (e.g., component A) in the mixture may be in a range of about 2 wt % to 100 wt % of weight of total mixture. In one approach, the concentration of porogen in the mixture may be in a range of greater than 0 wt % to about 98 wt % of weight of total mixture.

In one approach, the mixture may be optically transparent. The mixture may have the physical property of allowing light to pass through without being largely scattered or adsorbed, (i.e., the majority of the light passes through). For instance, light may enter and travel through the mixture in a relatively undisturbed fashion. In some approaches, the mixture may be transparent to the visible spectrum in a range from about 400 nanometers (nm) to the near-infrared, about 750 nm. In some approaches, the mixture may have a transparency of greater than 75% transmittance of light.

According to one embodiment, a method for forming a carbon aerogel includes forming or acquiring a photoresist composition. The photoresist composition may be used as a resin for 3D printing a structure using light-driven AM techniques, for example PμSL, DLW-TPP, etc. In some approaches, component A and component B of the photoresist composition may be mixed in a nozzle as an ink for using 3D printing AM techniques, for example, direct ink writing (DIW), etc.

In various approaches, the mixture includes a polymerization initiator (e.g., crosslinking agent, photoinitiator, etc.). In one approach, the polymerization initiator may be a thermal-active radical producing initiator. In another approach, the polymerization initiator may be a UV-active radical producing initiator. In various approaches, the concentration of the polymerization initiator in the mixture may be in a range of about 0.05 wt % to less than 2.0 wt % of weight of total mixture. In preferred approaches, the concentration of photoinitiator in the mixture is in a range of about 0.05% to about 1.0 wt % of total mixture.

One or more additives may be added to the mixture for optimal printing of a 3D structure, depending on the AM technique to be used. In various approaches, an additive to the mixture may include a photoabsorber, a polymerization inhibitor, etc. In one approach, the mixture includes a photoabsorber of any known type. Illustrative examples of photoabsorbers include benzopheone, benzotriazole, salicylate, etc.

The concentration of photoabsorber in the mixture may be similar to the concentration of photoinitiator in the mixture, or may be different.

In some approaches, the mixture includes a polymerization inhibitor of any known type. Illustrative examples of a polymerization inhibitor include tert-butylhydroquinone, hydroquinone, 4-methoxyphenol, phenothiazine, etc. In some approaches, the mixture may include a polymerization inhibitor at an effective amount for inhibiting continuous polymerization of the polyfunctional monomer after laser irradiation but not at an effective amount to prevent formation of a three-dimensional structure by light-mediated additive manufacturing techniques.

In some approaches, a polymerization inhibitor may be critical for determining the final porosity of printed parts formed by additive manufacturing techniques. In one approach, a concentration of polymerization inhibitor may be greater than 50,000 ppm. Without wishing to be bound by any theory, it is believed that during light-mediated additive manufacturing techniques, only a very small portion of porogen diluted monomer may be cured (e.g., voxel) within a larger surrounding matrix of un-cured resin mixture. The monomer species within the volume of voxel react via a radical-induced polymerization upon photo-initiation to give a porous, aerogel-like network. Modeling efforts and observations have shown that active radical species may not simply die out upon complete consumption of monomer. Instead the radicals remain and may continue to slowly react with monomers diffusing in over time from the bulk photoresist into the cured structure (e.g., voxel). Thus, titrating polymerization inhibitor to the concentration of un-cured resin may be critical to retaining porosity of the formed 3D structure.

Figure 2:
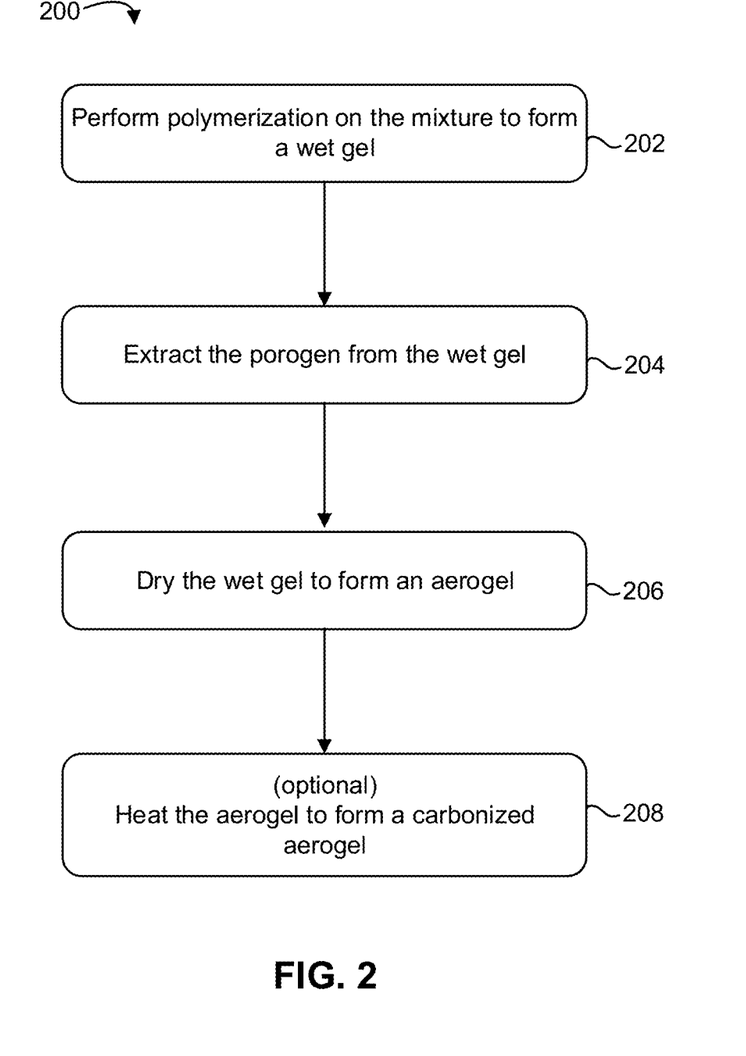
FIG. 2 is a flow chart of a method, according to one embodiment.

FIG. 2 shows a method 200 for forming an aerogel using the mixture as described herein, in accordance with one embodiment. As an option, the present method 200 may be implemented to form structures such as those shown in the other FIGS. described herein. Of course, however, this method 200 and others presented herein may be used to provide applications which may or may not be related to the illustrative embodiments listed herein. Further, the methods presented herein may be carried out in any desired environment. Moreover, more or less steps than those shown in FIG. 2 may be included in method 200, according to various embodiments. It should also be noted that any of the aforementioned features may be used in any of the embodiments described in accordance with the various methods.

As shown in FIG. 2, method 200 of forming an aerogel includes step 202 of performing polymerization on the mixture to form a wet gel. In various approaches, the polymerization reaction of the mixture may include a photopolymerization process. In some approaches, the performing polymerization may include curing the mixture to form a wet gel.

In various approaches, the mixture includes a polyfunctional monomer, a porogen, and a polymerization initiator. In some approaches, the mixture includes a polyfunctional monomer, a non-reactive diluent that is miscible with the polyfunctional monomer, a photoinitiator and a polymerization inhibitor. In one approach, the non-reactive diluent is a porogen (e.g., component B) and is miscible with the polyfunctional monomer (e.g., component A) of the mixture. In some approaches, the photoinitiator initiates a chemical polymerization process in response to UV irradiation that results in a network of covalently linked reacted polyfunctional monomer containing unreacted porogen. The network of crosslinked polyfunctional monomers that includes unreacted porogen may be in the form of a wet gel. In some approaches, the mixture includes a polymerization inhibitor to stop the photopolymerization of the mixture. In various approaches, the photopolymerization reaction includes crosslinking the polyfunctional monomers via the radiation-curable functional groups of the polyfunctional monomers.

In one approach of step 202, the mixture includes a polyfunctional monomer and a porogen as a non-reactive diluent. In one approach, the mixture includes a curable resinous material (e.g., a thermoset) that transforms from liquid to a solid during curing. In some approaches, the curing may be a thermal curing that includes heating the mixture to initiate a temperature-induced crosslinking of the polyfunctional monomer in a network with unreactive porogen. In other approaches, a thermal initiator may be added to the mixture to aid in initiating thermal curing. In yet other approaches, heating of the curing step may accelerate the crosslinking reaction catalyzed by a catalyst.

In other approaches, the curing may be a light-mediated curing step that includes a photoinitiator inducing a crosslinking of polyfunctional monomers in a network of unreactive porogen in response to UV irradiation. Examples of polyfunctional monomers having functional groups amenable to photoinitiated polymerization include acrylate, methacrylate, styrene, 1,3-butadiene, etc.

Step 204 of method 200 includes extracting the porogen from the wet gel. In one approach, the extraction of the porogen includes removing the porogen using a solvent exchange method. In one approach, the porogen polyethylene glycol may be exchanged with acetone, water, etc. In one approach, porogen may be removed by dissolution of the porogen into a co-solvent. In another approach, extraction of the porogen includes removing the porogen by Soxhlet extraction.

Step 206 of method 200 includes drying the wet gel to form an aerogel. Conventional aerogel drying techniques may be used, including drying at ambient temperatures, drying at elevated temperatures, supercritical drying, etc.

As an option in some approaches, following drying the wet gel to form an aerogel, step 208 includes heating the aerogel to form a carbonized aerogel. Conventional aerogel carbonization techniques may be used in step 208, such as, for example, pyrolysis in an inert atmosphere.

Figure 3A:
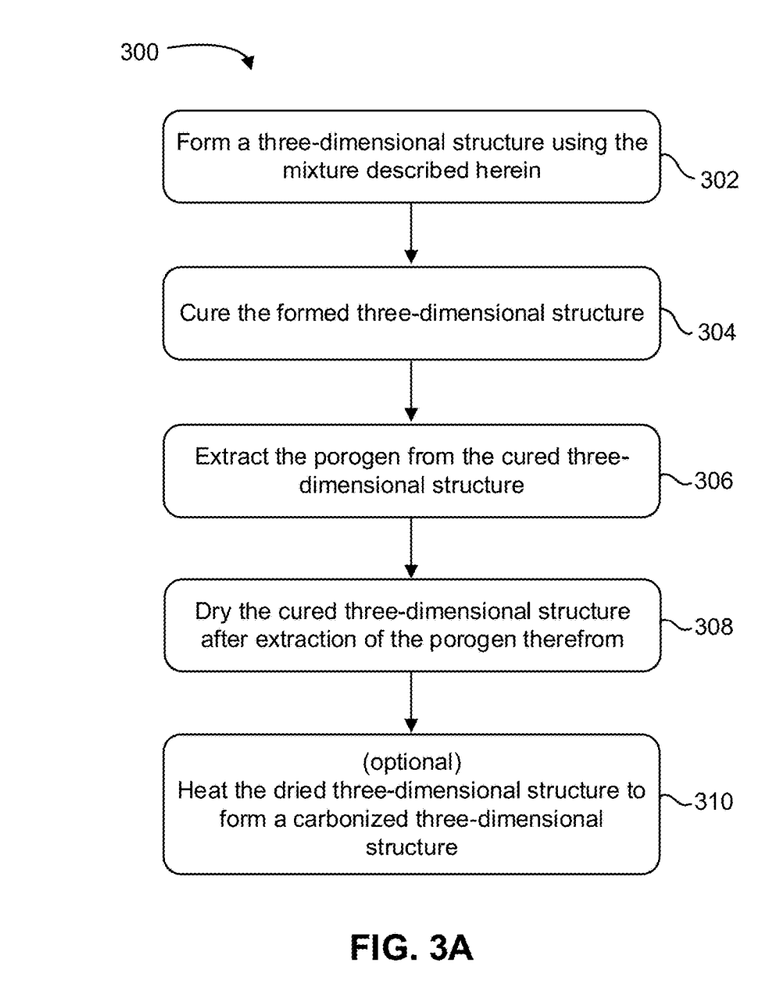
FIG. 3A is a flow chart of a method, according to one embodiment

FIG. 3A shows a method 300 for forming an aerogel having an engineered three-dimensional (3D) structures including ligaments defining pores therebetween, wherein the pores have an average diameter greater than about 100 nanometers, in accordance with one embodiment. As an option, the present method 300 may be implemented to form structures such as those shown in the other FIGS. described herein. Of course, however, this method 300 and others presented herein may be used to provide applications which may or may not be related to the illustrative embodiments listed herein. Further, the methods presented herein may be carried out in any desired environment. Moreover, more or less steps than those shown in FIG. 3 may be included in method 300, according to various embodiments. It should also be noted that any of the aforementioned features may be used in any of the embodiments described in accordance with the various methods.

Step 302 of method 300 includes forming a 3D structure by additive manufacturing using a mixture as described herein. In various approaches, the mixture includes a polyfunctional monomer, a non-reactive diluent such as a porogen that is miscible with the polyfunctional monomer, and a polymerization initiator. In various approaches, the polymerization initiator may be a crosslinking agent, a photoinitiator, a thermal initiator, etc. In various approaches, the ratio of mixture of component A and component B may be tailored for an additive manufacturing (AM) process for forming 3D structure to form an aerogel. In various approaches, the forming of a 3D structure by AM results in an engineered 3D structure.

In one approach, the mixture includes a polyfunctional monomer, a porogen, and a polymerization initiator, and a polymerization inhibitor. According to various approaches, a polymerization inhibitor is critical for forming a porous 3D structure. In one approach, the concentration of inhibitor is a critical parameter for controlling the porosity and mass and/or density of printed materials. In one approach, the concentration of inhibitor in the resin mixture is a critical parameter for tuning the porosity and mass and/or density of printed materials. In some approaches, the mixture may include an effective amount of polymerization inhibitor for forming a porous 3D structure. The effective amount of polymerization inhibitor is an amount that imparts the desired function or result, and may be readily determined without undue experimentation following the teachings herein and varying the concentration of the additive, as would become apparent to one skilled in the art upon reading the present description.

In various approaches, the concentration of inhibitor for a mixture used in forming a 3D structure by AM techniques may be in a range of greater than 0.05 wt % to about 3.5 wt % of total mixture. In one exemplary approach, the concentration of polymerization inhibitor may be in a range of greater than about 0.25 wt % to about 3.5 wt % of total mixture, but could be higher or lower.

In various approaches, additive manufacturing techniques allow the formation of three dimensional structures having ligaments defining pores therebetween, where the dimensions of the ligaments and subsequent pores therebetween may be controlled by additive manufacturing techniques. In some approaches, the pores between the ligaments of the formed 3D structure may have an average diameter greater than about 100 nanometers.

In one approach, the forming of a 3D structure by AM includes light-mediated AM techniques. In one approach, direct laser writing via two photon polymerization (DLW-TPP). In another approach, the forming of a 3D structure by AM includes projection micro-stereolithography (PμSL). In some approaches, light-mediated AM techniques form engineered 3D structures, e.g., gyroids, having nanoporous walls that separate micron-scale channels.

Figure 3B:
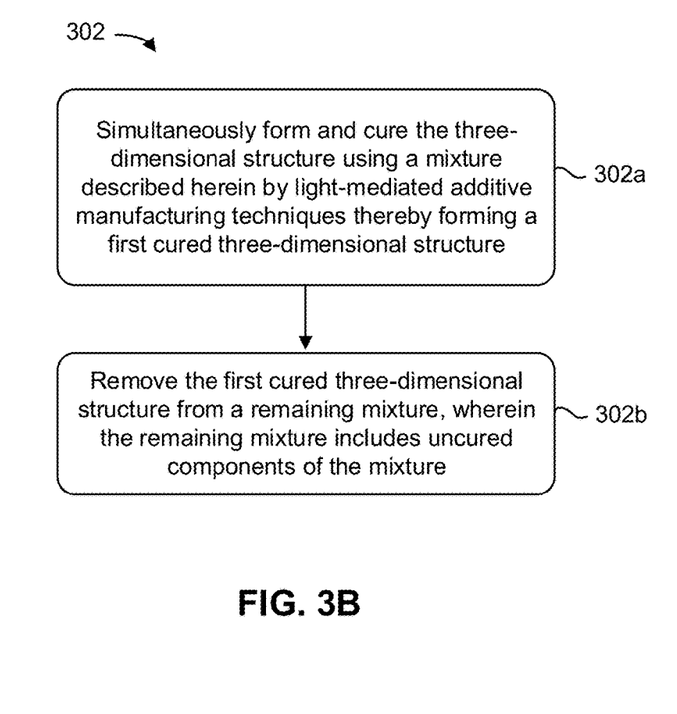
FIG. 3B is a flow chart of step 302 of the method in FIG. 3A, according to one embodiment.

Using light-mediated AM techniques, step 302 of method 300 of forming an engineered 3D structure includes several steps as shown in FIG. 3B. In one approach, forming the 3D structure of step 302a includes simultaneously forming and curing the 3D structure using a mixture described herein by light-mediated AM techniques thereby forming a first cured 3D structure. The next step 302b includes removing the first cured 3D structure from a remaining mixture, where the remaining mixture includes uncured components of the mixture.

In various approaches using light-mediated AM techniques, such as PµSL and DLW-TPP technologies, step 302 of forming the engineered 3D structure involves patterned UV-light, so the material is cured during the AM process as described in step 302a. The AM process is also performed in a bath of the mixture including monomer, hence the mixture preferably includes a high concentrations of polymerization inhibitor, for example up to about 3.5 wt % of total mixture. After formation of the 3D structure, step 302b includes washing away from the 3D structure any residual uncured photoresist mixture. In some approaches, the 3D structure is removed from the bath of the mixture, e.g., removing the 3D structure from solution. In preferred approaches, the formed 3D structure that is wet with residual photoresist mixture is rinsed and/or residual photoresist mixture is wiped away from the 3D structure. The 3D structure, formed by light-mediated AM processes, having substantially no residual photoresist may proceed to step 304 of method 300. In some approaches, the 3D structure formed by light-mediated AM processes may include some functional groups that may be subject to additional curing in subsequent steps (e.g., step 304) of the method.

In one approach, the forming of a 3D structure includes an ink-mediated AM technique, e.g., direct ink writing (DIW). The resist mixture including a polyfunctional monomer, porogen, and polymerization initiator as described herein may be an ink, in which the curing of the mixture is after the formation of the 3D structure by DIW. In contrast to the light-mediated processes of DLW-TPP and PµSL, the material being extruded during the DIW process is self-supporting to form a structure (shear-thinning material). Ink-mediated AM processes tend to be "dry processes," a process that does not involve formation of the 3D structure in a solution. The 3D structure formed by extrusion during DIW is a structure of uncured material. In approaches of forming a structure by DIW, the curing (e.g., polymerization reaction) of the material of the structure may include a thermal curing process, a chemical catalyst, an electrochemical polymerization process, an oxidative process, etc.

Once step 302 of forming an engineered 3D structure is completed, method 300 proceeds to step 304 of curing the formed 3D structure. Illustrative examples of curing the 3D structure may include application of thermal-mediated curing techniques (e.g., placing the 3D structure in an oven), application of UV-irradiation, etc. In approaches where the structure is formed by light-mediated AM techniques and substantially all uncured resist mixture has been removed, step 304 may be a second curing of the material of the formed 3D structure. In other approaches, where the structure is formed by ink-mediated AM techniques (e.g., via a nozzle), step 304 may be a first curing of the material of the formed 3D structure.

In some approaches, the cure profile, e.g., thermal, UV, etc., may provide a means for tuning the microstructure. For example, in some approaches using the light-mediated AM process to form a 3D structure, an additional thermal cure of the 3D structure formed with the photoresist resin may result in a "string of pearls" morphology of particles in the 3D structure. In other approaches using the light-mediated AM process to form a 3D structure, an additional UV-cure of the 3D structure formed with the photoresist resin that includes a UV initiator may result in a more fractal-like network having finer particles and smaller pores. Without wishing to be bound by any theory, it is believed that the curing of step 304 (e.g., by UV irradiation) increases crosslinking of the monomers of the structure and thus may result in increased mechanical strength.

In some approaches, curing may be mediated by thermal-mediated curing. In various approaches, thermal curing is not location selective and thus thermal curing is preferably used in combination with AM methods that control the morphology of the printed structure by non-thermal mediated means (e.g., with light in the case of PµSL or nozzle location in the case of DIW).

Following curing of step 304, step 306 includes extracting the porogen from the cured 3D structure. In some approaches, the extracting of the porogen may include methods of solvent exchange. In some approaches using light-mediated AM techniques, some of the initial porogen may have been exchanged with solvent during step 302b of removing uncured mixture from the structure. In some approaches, step 306 may be repeated several times to remove substantially all of the porogen by exchanging the porogen with solvent. In various approaches, step 306 results in a wet gel 3D structure having pores filled substantially with solvent where the pores were prior filled with porogen.

Various methods as understood by one skilled in the art may be employed to remove the porogen. Various examples include, and are not meant to be limiting, removing the porogen by solvent exchange, super-critical extraction, etc. In one exemplary approach, the extraction of the porogen includes removing the porogen using a solvent exchange method.

In some approaches, step 306 is followed by step 308 of drying the cured 3D structure after extraction of the porogen therefrom. Following exchange of substantially all porogen of step 306, the wet gel of the 3D structure is dried in step 308. In preferred approaches, the nanoporosity of the material of the 3D structure is maintained during supercritical drying step. The dry gel or aerogel may only be formed after removing the solvent that fills both kinds of pores which is typically done by supercritical drying although air drying might work as well if the structure is mechanically strong enough. In some approaches, step 308 may include methods of supercritical drying, lyophilization, evaporation, etc. to dry the wet 3D structure.

In one approach, the dried aerogel is a porous material comprised of a monomer of the mixture of step 302 used in the AM processing of step 304. Thus, the monomer itself forms the porous material may be engineered to tune the properties of the porous material.

In some embodiments, an electroconductive material is preferable. A heating step may be included to decompose and carbonize the polymer of the structure, thus introducing electroconductivity. According to one embodiment, after removal of the porogen and drying the 3D structure, method 300 may include, as an option, step 310 of heating the dried three-dimensional structure to form a carbonized three-dimensional structure.

In one approach, the 3D structure may be carbonized by heating the specific aromatic photoresist components of the 3D structure to a temperature effective to remove oxygen and hydrogen from the structure. For example, in one approach, the structure may be heated to temperatures greater than 800° C. The resulting structure may be a conductive carbon aerogel-like material.

According to various embodiments, a polymer resin has been formulated for forming a 3D structure by additive manufacturing. The methods described herein may generate well-defined and highly porous (e.g. to the sub-micron level) structures by porogen leaching. The resulting well-defined nano-porous polymer framework may be carbonized into carbon aerogels.

In one embodiment, a product includes a porous 3D structure formed by additive manufacturing, where the three-dimensional structure has ligaments (e.g., features, structural components, etc.) arranged in a geometric pattern where the ligaments define pores therebetween. In some approaches, the porous 3D structure has hierarchical porosity such that the porosity of the structure formed by the additively manufactured ligaments is macro or mesoporous, where the ligaments themselves are formed of nanoporous material. An example of such a 3D structure 500 in which the ligaments 502 are arranged in a geometric pattern is shown in parts (b) through (d) of FIG. 5. In some approaches, the ligaments 502 of the 3D structure are nanoporous, as shown in part (g) of FIG. 5. In some approaches, the average diameter d of the pores 504 may be greater than 1 μm. In some approaches, the average diameter of the pores may be greater than about 10 μm.

Figure 5:
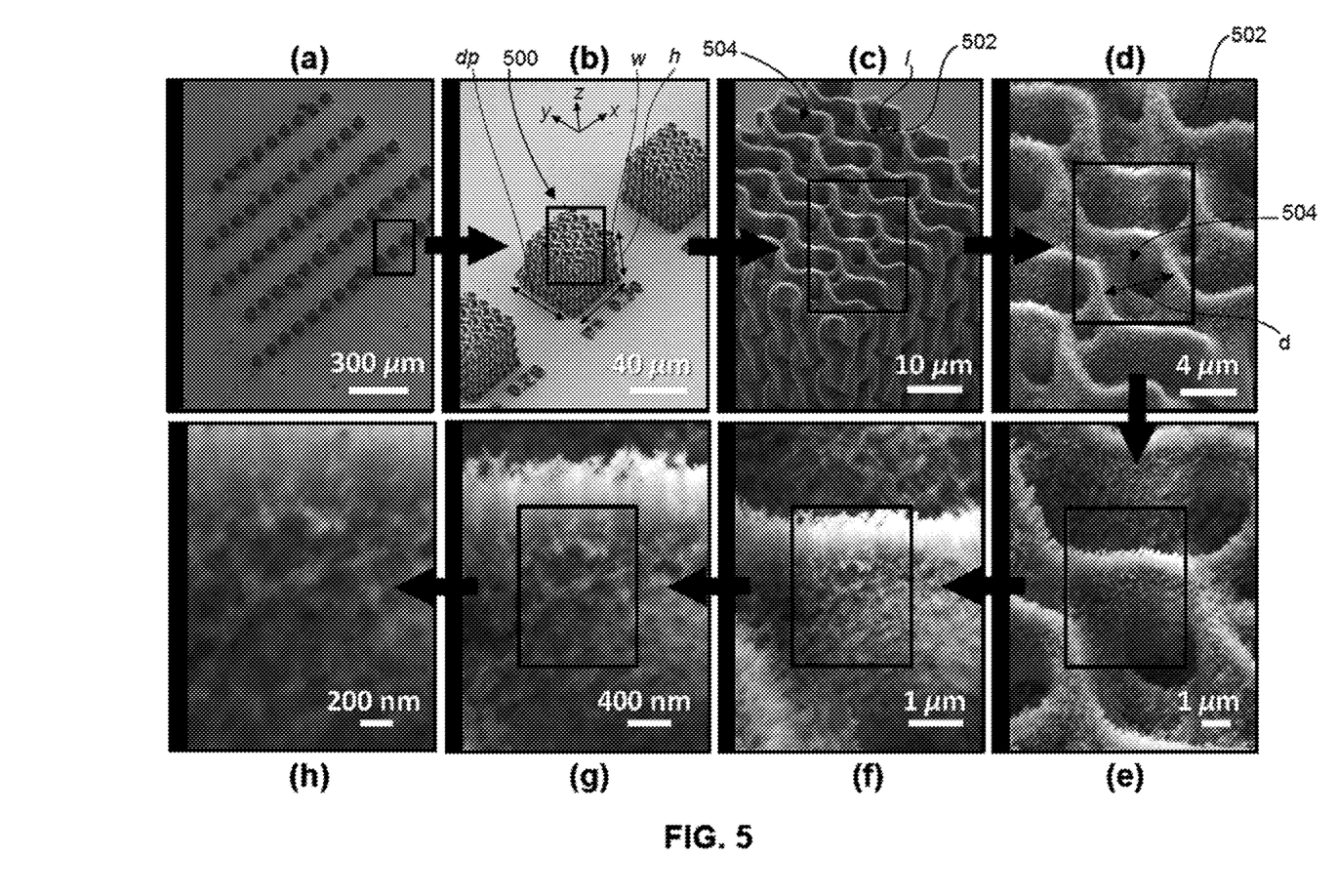
FIG. 5 is a series of images of increasing magnification by scanning electron microscope of a 3D printed porous polymer structure formed by direct laser writing-two photon polymerization (DLW-TPP), according to one embodiment. The image of part (a) is the lowest magnified view of the structure, and the image in each subsequent part (b), (c), (d), (e), (f), (g), and (h) represents a magnified view of a portion of the preceding image, e.g., part (b) is a magnified view of a portion of the image of part (a).

In some approaches, the average length scale l of the ligaments 502 may be greater than 100 nm, as shown in part (c) of FIG. 5. A length scale of a ligament may be defined as the length of a ligament in a longitudinal direction from one edge of a pore to the opposite edge of the pore. An average diameter of the ligaments may be in a range of about 1 μm to about 1000 μm. In various approaches, the 3D structure has porosity where the pores within the geometric pattern have an average diameter greater than about 10 μm. In some approaches, the 3D structure may be mesoporous. In some approaches, the 3D structure may be macroporous.

Moreover, at least 95% of a volume of the 3D structure measured according to outer dimensions of the 3D structure corresponds to the pores and less than 5% of the volume measured corresponds to the material of which the 3D structure is formed. As an example, and looking to part (b) of FIG. 5, outer dimensions of the 3D structure 500 may be measured by hypothetically wrapping a the 3D structure 500 with a film and then measuring the outer dimensions of the structure that now appears to be monolith structure, in which a height h may be measured in the z direction, a width w may be measured in an x direction, and a depth dp may be measured in a y direction. Thus, the volume of the 3D structure 500 $V_{500}$ may be calculated as $V_{500}=w·h·dp$.

In one approach, less than 20% of a volume measured according to the outer dimensions of the 3D structure may be material and at least 80% of the volume is void space. In other words, at least 80% of the volume measured according to the outer dimensions of the 3D structure may correspond to pores.

In one approach, less than 10% of a volume measured according to the outer dimensions of the 3D structure may be material and at least 90% of the volume is void space. In other words, at least 90% of the volume measured according to the outer dimensions of the 3D structure may correspond to the pores. In one approach, less than 5% of a volume measured according to outer dimensions of the 3D structure may be material and at least 95% of the volume is void space. In other words, at least 95% of the volume measured according to the outer dimensions of the 3D structure may correspond to the pores. In one exemplary approach, at least 98% of the volume of the 3D structure measured according to outer dimensions of the 3D structure may correspond to the pores. In other words, the product includes a porous polymer 3D structure formed by additive manufacturing as described herein and less than 2% of the volume is material and at least 98% of the volume is void space.

In various approaches, the product may be formed from a tuned photoresist engineered with appropriate concentrations of polymerization inhibitor to form a porous polymer 3D structure having less than 2% of the volume is material and at least 98% of the volume is void space.

In one approach, the geometric pattern of the 3D structure determines the mechanical properties and preferably provides channels to direct mass transport through the structure, according to the AM process used to form the 3D structure. The initial presence of component B, e.g., porogen, in the resist mixture provides porogen-induced nanoporosity of the structure thereby resulting in increased surface area for a given volume of material. In some approaches, the product as described herein includes a surface area of the three-dimensional structure in a range of about 400 $m^2/g$ to about 3000 $m^2/g$.

In various approaches, the polymer 3D structure formed by additive manufacturing has hierarchical porosity, where the structure of the product is a lattice providing channels between the beams of the lattice. The plurality of pores within the beams of the lattice, e.g., the porous material used to print the lattice structure, provide an additional level of porosity to the structure. The outer dimensions of the structure, e.g., lattice formation, provide a measurement of the volume of the structure, of which at least 80% is void space. In some approaches, the outer dimensions of the structure provide a measurement of the volume of the structure, of which at least 90% is void space. In yet other approaches, the outer dimensions of the structure provide a measurement of the volume of the structure, of which at least 98% is void space. In addition, the geometric pattern of the structure generates increased surface area compared to a monolithic structure having similar volume dimensions.

In various embodiments, each 3D additive manufacturing process (e.g., DLW-TPP, PµSL, DIW, etc.) allows an engineered structure having a geometric pattern, e.g., gyroid structures. According to various approaches, the engineered structure may include nano-porous walls that separate micron-scale channels. In other words, the spacing between the porous features of the structure may be inner channels having an average diameter in the microscale. The inner channels may extend along the length of the structure in a longitudinal direction thereof.

In some approaches, the porous 3D structure may be a carbonized aerogel having features and dimensions as described for the porous polymer printed 3D structure precursor. In some approaches, the porous 3D carbon aerogel may have features arranged in a geometric pattern. The average diameter of the features of the carbon aerogel structure may be greater than one micron (1 μm), and the features may be porous. Further, the features may be defined by pores between the features of the 3D structure.

In some approaches, the carbonized aerogel may include a coating prior to carbonization to maintain the nanoporous features of the 3D structure formed by AM techniques. In some approaches, the coating may include alumina, titania, etc. In another approach, a coating may include nickel. Various techniques generally known by one skilled in the art may be employed to apply the coating to the structure prior to carbonization, including, but not limited to, atomic layer deposition.

According to various embodiments described herein, macroscopic carbon aerogels may be fabricated with engineered hierarchical structures that include a digitally engineered macroporous system for fast mass transport and mechanical strength, and nanopores for high surface area.

Experiments

Figure 4A:
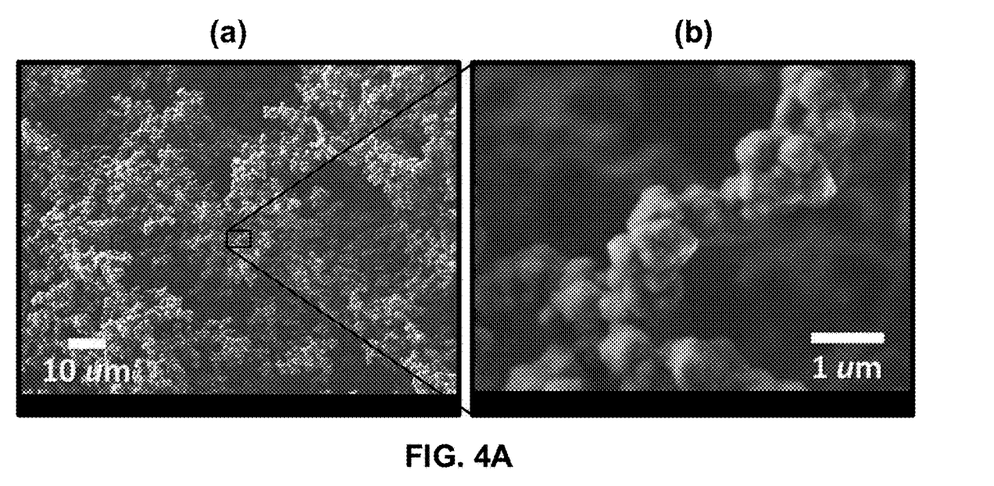
FIG. 4A is a series of scanning electron microscope images of a porous polymer foam formed using a thermal cure and treated by porogen leaching, according to one embodiment. The image of part (b) is a magnified view of a portion of the image of part (a).
Figure 4B:
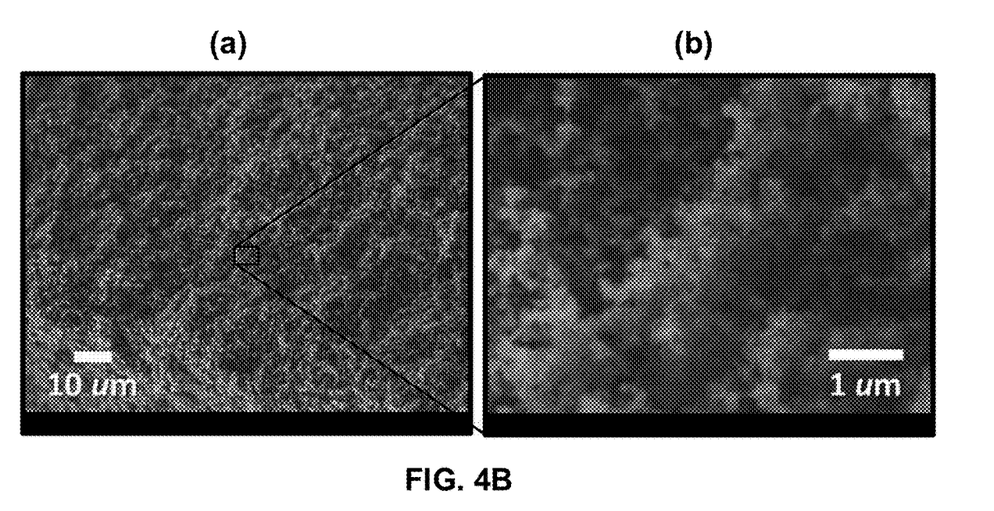
FIG. 4B is a series of scanning electron microscope images of a porous polymer foam formed using an ultra-violet (UV) cure and treated by porogen leaching, according to one embodiment. The image of part (b) is a magnified view of a portion of the image of part (a).

Two commercially available components, pentaerythirotal triacrylate (PETA) and PEG-400 were mixed in a ratio of 8:92 wt % ratio and combined with either a thermal- or UV-active radical-producing initiator. Curing followed by supercritical extraction yielded porous foams with bulk densities of approximately 0.12 g/cc. As shown in FIGS. 4A-4B, different cure profiles resulted in different microstructures of the 3D structure. Thermal curing, as shown in the scanning electron microscope (SEM) images of FIG. 4A formed a "string of pearls" morphology. The image in part (b) is a magnified view of a portion of the image of part (a). The size of particles following thermal curing had an average diameter of approximately 100 to 500 nm. UV curing, as shown in SEM images of FIG. 4B, formed a more fractal-like network of much finer particles and smaller pores. The image of part (b) is a magnified view of a portion of the image in part (a).

The porous photoresists were used to form 3D-structures by additive manufacturing techniques. FIG. 5 shows a series of increasing magnifications of a porous polymer structure formed by DLW-TPP, according to one embodiment. The image of part (b) is a magnified view of a portion of the image of part (a), the image of part (c) is a magnified view of a portion of the image of part (b), the image of part (d) is a magnified view of a portion of the image of part (c), the image of part (e) is a magnified view of a portion of the image of part (d), the image of part (f) is a magnified view of a portion of the image of part (e), the image of part (g) is a magnified view of a portion of the image of part (f), and the image of part (h) is a magnified view of a portion of the image of part (g).

The series of FIG. 5 demonstrates a 3D structure arranged in a geometric pattern (parts (a) to (c)). The average diameter of the features is less than 100 nm (parts (c) to (e)) and the features are porous (parts (e) to (h)). Further, the pores of the features have an average diameter of less than 200 nm (part (h)).

Figure 6:
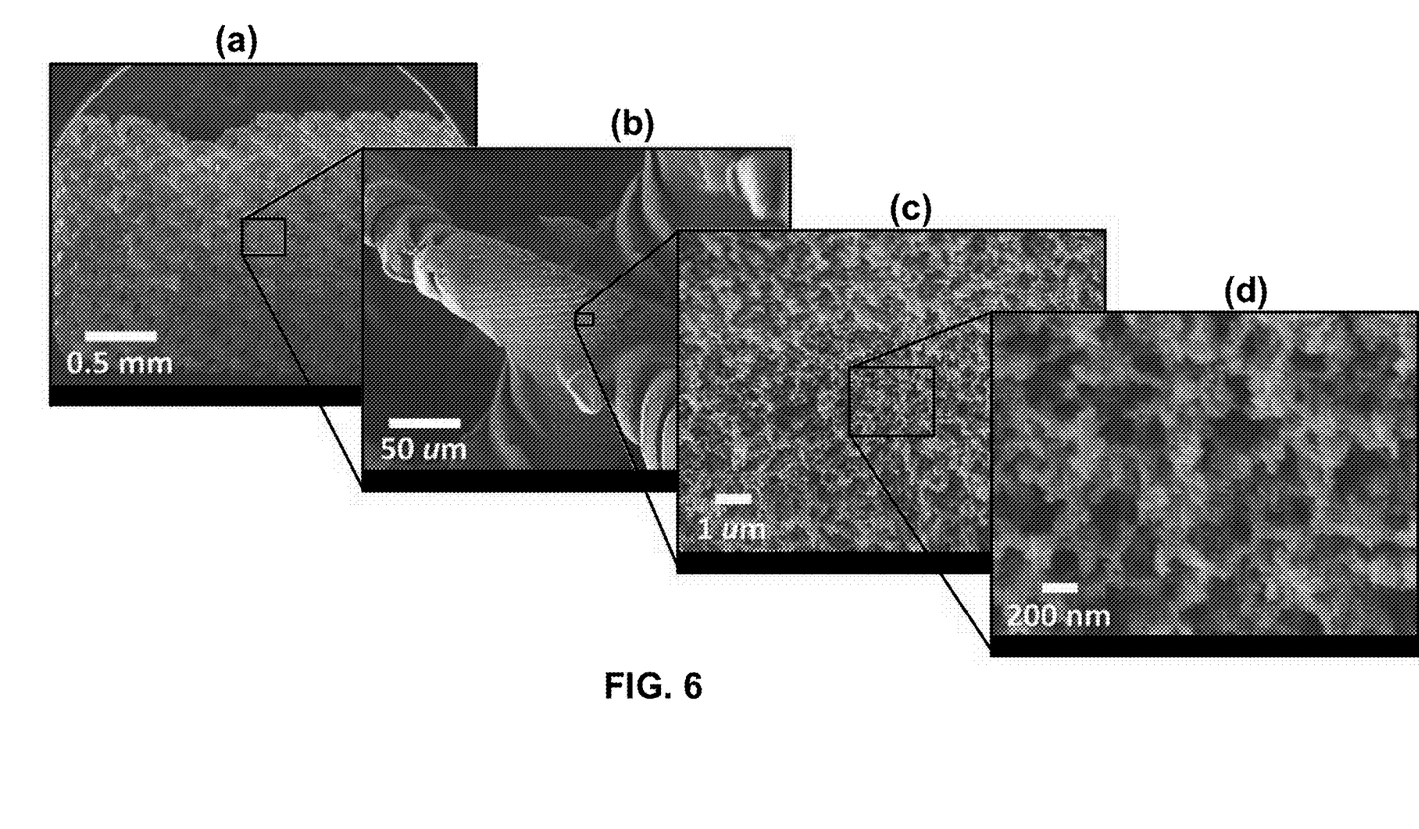
FIG. 6 is a series of images of increasing magnification by scanning electron microscope of a 3D printed porous polymer structure formed by projection micro-stereolithography (PμSL), according to one embodiment. The image of part (a) is the lowest magnified view of the structure, and the image in each subsequent part (b), (c), and (d) represents a magnified view of a portion of the preceding image, e.g., part (b) is a magnified view of a portion of the image of part (a).

FIG. 6 shows a series of increasing magnifications of a porous polymer structure formed by PμSL, according to one embodiment. The image of part (b) is a magnified view of a portion of the image of part (a), the image of part (c) is a magnified view of a portion of the image of part (b), the image of part (d) is a magnified view of a portion of the image of part (c).

As shown, the series demonstrates a millimeter scale structure having a geometric pattern (part (a)) with microscale features with an average diameter of about 50 microns (part (b)). The features are porous (part (c)) with an average pore diameter of less than 200 nm (parts (c) and (d)).

As shown in each series of FIG. 5 and FIG. 6 using each 3D printing process (DLW-TPP or PμSL), the designed test structures were gyroid structures where the development of each structure included nano-porous walls that separate micron-scale channels.

Figure 7:
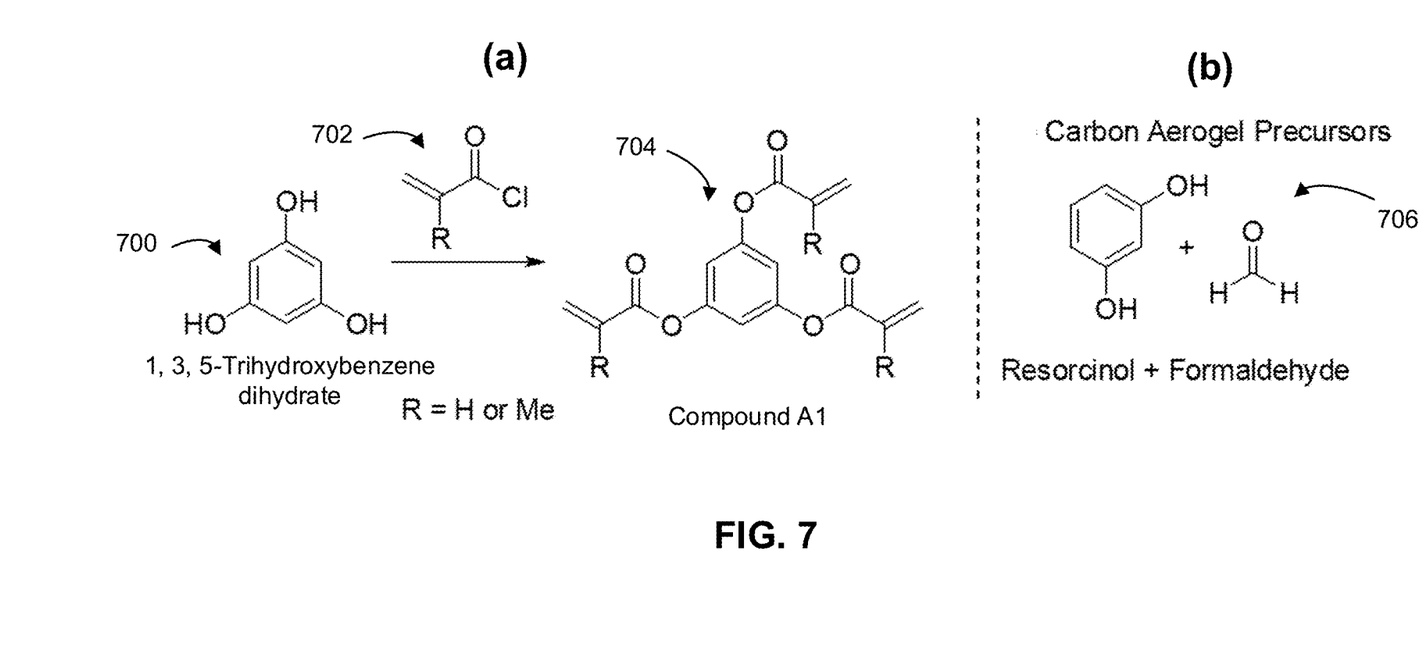
FIG. 7 depicts molecular structure of components of a method, according to one embodiment. Part (a) represents the molecular structures of the formation of component A1. Part (b) depicts the molecular structures of resorcinol+ formaldehyde.

To enable direct carbonization of the porous photoresist structure, a series of aromatic monomers were designed and synthesized. As depicted in the molecular structures of part (a) of FIG. 7, 1,3,5-Trihydroxybenzene dihydrate 700 was treated with methacryloyl chloride 702 under alkaline conditions to drive Compound A1 704 in high yield. Cross-linked Compound A1 704 was designed to mimic the sol-gel formed between resorcinol and formaldehyde 706 (molecular structures shown in part (b) of FIG. 7), which have been used extensively as precursors in the synthesis of carbon aerogels.

Figures 8A, 8B, 8C:
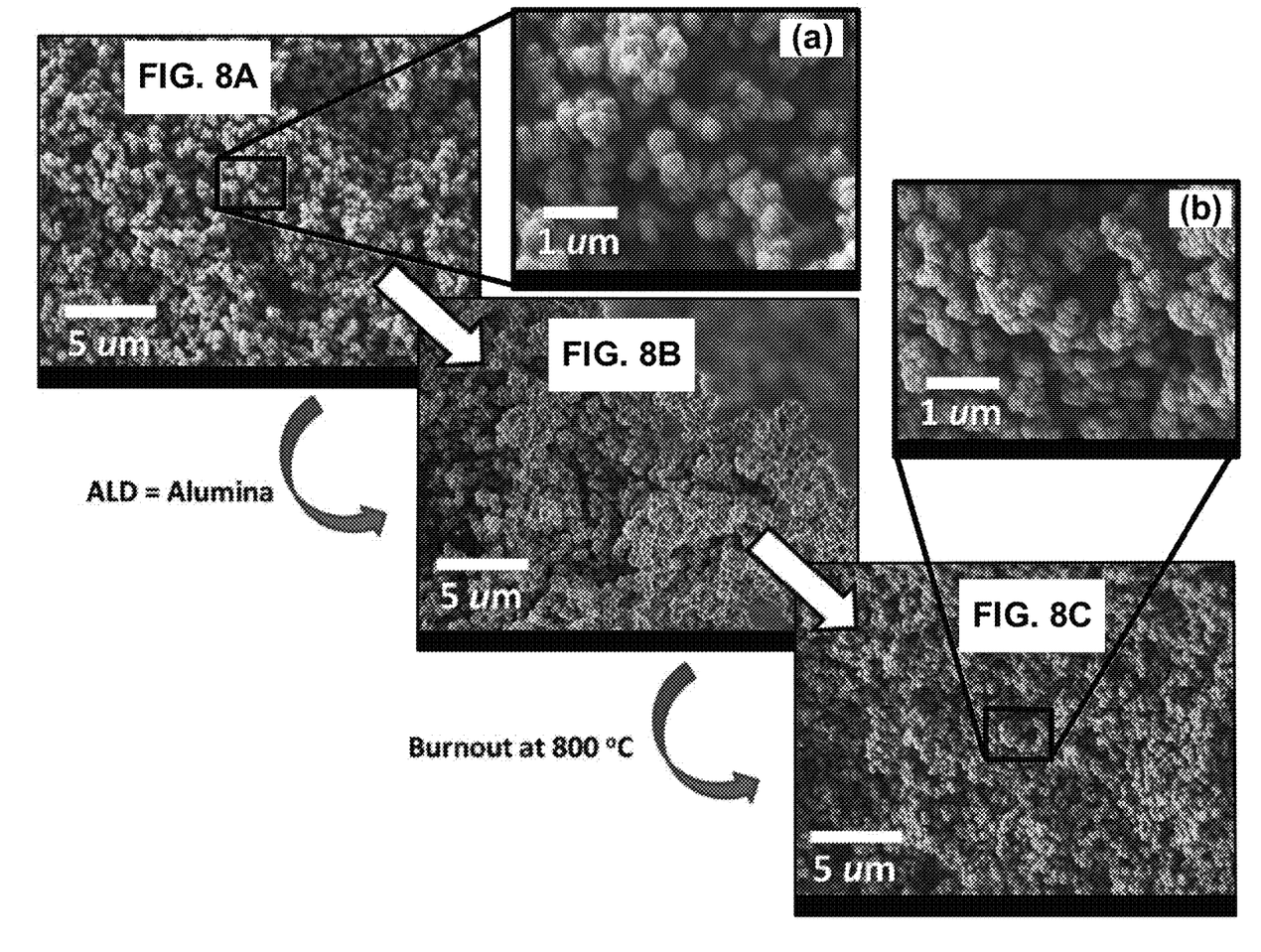
FIG. 8A is an image of a nanoporous network of a photoresist after porogen leaching, according to one embodiment. Part (a) is a magnified view of a portion of the image of FIG. 8A.
FIG. 8B is an image of composite of a structure formed with an application of alumina coating, according to one embodiment.
FIG. 8C is an image of a carbonized alumina-coated composite, according to one embodiment. Part (b) is a magnified view of a portion of the image of FIG. 8C.

UV-curing of Compound A1 and aromatic photoresists yielded nano-porous networks when combined with a porogen (FIG. 8A). A magnified view of a portion of the image of FIG. 8A is shown in part (a). Direct carbonization of porous Compound A1 gave complete structure collapse resulting in loss of both sample shape and pore morphology (not shown). This issue was remedied by applying an ultrathin ALD coating of 1-2 nm alumina (FIG. 8B); the resulting composite could be subsequently carbonized without loss of pore morphology (compare FIG. 8A to FIG. 8C, see also magnified image in part (b) of a portion of the image in FIG. 8C).

Figure 9A:
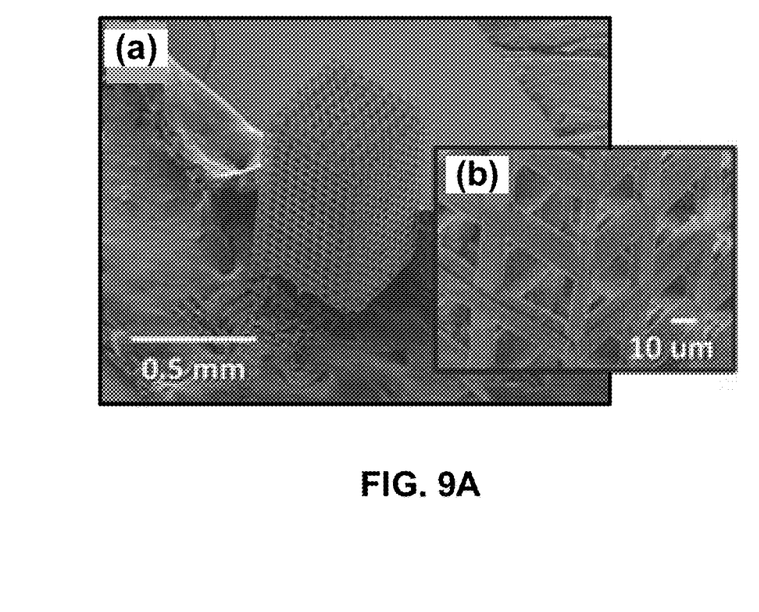
FIG. 9A, part (a) is a scanning electron image of a cubic lattice test article printed using two photon lithography, according to one embodiment. Part (b) is a magnified view of a portion of the cubic lattice test article of part (a).
Figure 9B:
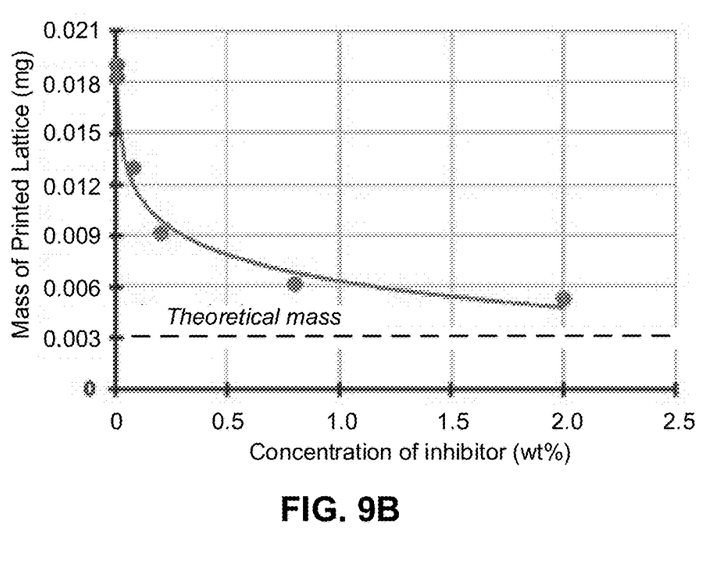
FIG. 9B is a plot of the mass of the lattice structure printed with photoresists containing 90% porogen, 10% monomer as a function of vary concentrations of polymerization inhibitor.

The criticality of the presence of polymerization inhibitor in the resin mixture is shown in FIGS. 9A-9B. FIG. 9A is a SEM image of a 0.5×0.5×1 mm$^3$ cubic lattice structure formed with a 90% porogen/10% monomer resin. The inset of FIG. 9A is a magnified view of a portion of the structure showing the porosity of the structure. FIG. 9B is a plot of the mass of a printed lattice formed with resin mixtures having increasing concentration of polymerization inhibitor. As shown, the theoretical mass for the test part composed of 90% porous struts is 0.003 mg (dashed line). A cubic lattice part formed with a resin containing zero polymerization inhibitor weighed 0.018 mg. Addition of increasing amounts of inhibitor (4-methoxyphenol, MEHQ) yielded cubic lattice parts with decreasing mass. The resulting curve with increasing inhibitor concentration represented a logarithmic relationship which allowed a prediction that 3.5 wt % inhibitor may yield a cubic lattice part having the theoretical mass of 0.003 mg. Cubic lattice parts were obtained from 2.5 wt % inhibitor (mass=~0.005 mg) increased from a starting concentration of 0.004 wt % inhibitor (mass=0.018 mg).

In Use

According to various embodiments, 3D polymer foams and carbon aerogels formed by additive manufacturing having hierarchical porosity with increased surface area may be used for energy storage, for example, electrodes, membranes, and light weight yet stiff materials, for super capacitors, flow batteries, lithium ion batteries, and electrochemical reactors. In various embodiments, uses may include carbonized aerogels for electrical conductivity applications. Some embodiments may be used as NIF targets for Nuclear Weapons Stockpile Stewardship. Some embodiments may be useful as engineered absorbent and sensor materials for chemical and biological countermeasures.

According to various embodiments, 3D polymer structures formed by additive manufacturing having hierarchical porosity with increased surface area may be used for tissue and organ development, cell structures, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A mixture comprising:
    a monomer having at least one functional group amenable to polymerization;
    a porogen;
    a polymerization initiator; and
    a polymerization inhibitor present at an effective amount to prevent polymerization of an unirradiated portion of the mixture after laser irradiation of a portion of the mixture,
    wherein the mixture is configured to undergo phase segregation upon the laser irradiation whereby the monomer transforms from a liquid to a self-supporting polymeric solid and the porogen remains a liquid within nanopores of the self-supporting polymeric solid,
    wherein the porogen is present in an effective amount to cause the self-supporting polymeric solid to have a nanoporosity,
    wherein the polymerization inhibitor is present in the mixture in a concentration greater than 50,000 ppm.

2. The mixture as recited in claim 1, wherein the at least one functional group amenable to polymerization is selected from the group consisting of: acrylate, methacrylate, epoxide, olefin, isocyanate, and mercapto+olefin.

3. The mixture as recited in claim 1, wherein the monomer is present in a polymer having a plurality of monomers in a chain thereof.

4. The mixture as recited in claim 1, wherein the porogen is a non-reactive component.

5. The mixture as recited in claim 1, wherein the porogen is a liquid solvent.

6. The mixture as recited in claim 1, wherein the porogen is miscible with the monomer.

7. The mixture as recited in claim 1, wherein a concentration of the monomer in the mixture is in a range of about 2 wt % to less than 100 wt % of weight of total mixture.

8. The mixture as recited in claim 1, wherein a concentration of the porogen in the mixture is in a range of greater than 0 wt % to about 98 wt % of weight of total mixture.

9. The mixture as recited in claim 1, wherein a ratio of the monomer to the porogen is in a range of about 2 parts to 98 parts (2:98) to about 50 parts to 50 parts (50:50) on the basis of weight.

10. The mixture as recited in claim 1, wherein the polymerization initiator is a photoinitiator.

11. The mixture as recited in claim 1, wherein a concentration of the polymerization initiator in the mixture is in a range of about 0.05 wt % to about 1.0 wt % of weight of total mixture.

12. The mixture as recited in claim 1, comprising a photoabsorber.

13. An ink comprising:
    a polyfunctional monomer having a single monomeric unit and at least two functional groups amenable to polymerization;
    a porogen;
    a polymerization initiator; and
    a polymerization inhibitor,
    wherein the polymerization inhibitor is present in an effective amount to allow formation of a self-supporting structure having a total porosity in a range greater than 80% by volume,
    wherein the porogen is present in an effective amount to cause the self-supporting structure to have a nanoporosity,
    wherein the amount of the polymerization inhibitor is in a range of about 2.2 wt. % to about 5.0 wt. % of the total mixture.

14. The ink as recited in claim 13, wherein at least one of the at least two functional groups amenable to polymerization is selected from the group consisting of: acrylate, methacrylate, epoxide, olefin, isocyanate, and mercapto+olefin.

15. The ink as recited in claim 13, wherein the ink is physically characterized as being extrudable into self-supporting ligaments arranged in a geometric pattern having pores defined between the ligaments.

16. The ink as recited in claim 13, wherein a concentration of the polyfunctional monomer in the ink is in a range of about 2 wt % to less than 100 wt % of weight of total ink.

17. The ink as recited in claim 13, wherein a ratio of the polyfunctional monomer to the porogen is in a range of about 2 parts to 98 parts (2:98) to about 50 parts to 50 parts (50:50).

18. The mixture as recited in claim 1, wherein the mixture is optically transparent.

19. The mixture as recited in claim 1, wherein the porogen is configured to not participate in the transformation of the monomer into a solid.

20. The mixture as recited in claim 1, wherein the mixture is a resin mixture configured to be printed into a self-supporting three-dimensional structure using light-directed printing.

21. The mixture as recited in claim 1, wherein the mixture is configured to form a structure having a porosity in a range of greater than 91% to about 98%.

22. The mixture as recited in claim 1, wherein a ratio of the monomer to the porogen is in a range of greater than 1:25 to 1:49 on the basis of weight.

23. The mixture as recited in claim 13, wherein the amount of the polymerization inhibitor is in a range of greater than 0.5 wt. % to about 5.0 wt. % of the total mixture.

* * * * *